(12) United States Patent
Morita et al.

(10) Patent No.: US 10,205,821 B2
(45) Date of Patent: Feb. 12, 2019

(54) MOBILE PHONE, DISPLAY CONTROL METHOD, AND NON-TRANSITORY COMPUTER-READABLE RECORDING MEDIUM

(71) Applicant: KYOCERA Corporation, Kyoto (JP)

(72) Inventors: Hisae Morita, Yokohama (JP); Kazuki Morita, Machida (JP); Shunichi Kishimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/411,106

(22) Filed: Jan. 20, 2017

(65) Prior Publication Data

US 2017/0223177 A1 Aug. 3, 2017

(30) Foreign Application Priority Data

Jan. 29, 2016 (JP) ................................. 2016-016290

(51) Int. Cl.
*H04M 1/725* (2006.01)

(52) U.S. Cl.
CPC .... *H04M 1/72597* (2013.01); *H04M 1/72552* (2013.01); *H04M 1/72583* (2013.01)

(58) Field of Classification Search
CPC .......................... H04M 1/72597; G06F 3/048
See application file for complete search history.

(56) References Cited

U.S. PATENT DOCUMENTS

| | | | | |
|---|---|---|---|---|
| 6,686,938 B1 * | 2/2004 | Jobs | ...................... | G06F 3/0481 715/769 |
| 8,823,507 B1 * | 9/2014 | Touloumtzis | ........... | H04L 67/24 340/501 |
| 9,146,671 B2 | 9/2015 | Ishibashi | | |
| 9,503,415 B2 * | 11/2016 | Goulart | .................... | H04L 51/36 |
| 2001/0035881 A1 * | 11/2001 | Stoakley | ............... | G06F 3/0481 715/772 |
| 2004/0061716 A1 * | 4/2004 | Cheung | .................... | G06F 9/542 715/710 |
| 2005/0250551 A1 * | 11/2005 | Helle | ..................... | H04M 19/04 455/567 |
| 2005/0268237 A1 * | 12/2005 | Crane | .................... | G06F 3/0481 715/732 |

(Continued)

FOREIGN PATENT DOCUMENTS

| | | |
|---|---|---|
| JP | 2009-116683 A | 5/2009 |
| JP | 2013-257740 A | 12/2013 |
| JP | 2014-067247 A | 4/2014 |

OTHER PUBLICATIONS

Keiichi Goutsu, "Heads-Up notification, which displays notifications in manner of pop-up", Android Smart, Japan, New AKIBA Co., Ltd., Jul. 9, 2014, date of search: Aug. 5, 2016, URL, http://android-smart.com/2014/07/headsupnotifications.html.

(Continued)

*Primary Examiner* — Cindy Trandai
(74) *Attorney, Agent, or Firm* — Studebaker & Brackett PC

(57) ABSTRACT

A mobile phone of the feature-phone type comprises a controller configured to display an active Heads-Up Notification in a display and, after a predetermined time period, hide the active Heads-Up Notification and, display a passive Heads-Up Notification in the display and, after a predetermined time period, forcibly hide the passive Heads-Up Notification.

8 Claims, 6 Drawing Sheets

(56) References Cited

U.S. PATENT DOCUMENTS

| | | | | |
|---|---|---|---|---|
| 2009/0261984 | A1* | 10/2009 | Sugimoto | H04N 17/02 340/691.1 |
| 2010/0115033 | A1* | 5/2010 | Geffner | G06Q 10/107 709/206 |
| 2010/0281409 | A1* | 11/2010 | Rainisto | H04M 1/72522 715/767 |
| 2011/0205150 | A1* | 8/2011 | Saito | G11B 19/042 345/156 |
| 2012/0204191 | A1* | 8/2012 | Shia | G06Q 10/10 719/318 |
| 2012/0311578 | A1* | 12/2012 | Hara | G06F 9/45558 718/1 |
| 2013/0003953 | A1* | 1/2013 | Okubo | H04M 1/7255 379/93.17 |
| 2013/0335341 | A1 | 12/2013 | Ishibashi | |
| 2014/0152757 | A1* | 6/2014 | Malegaonkar | H04N 7/147 348/14.01 |
| 2014/0274002 | A1* | 9/2014 | Hogan | H04W 4/12 455/415 |
| 2015/0235240 | A1* | 8/2015 | Chang | G06Q 30/0202 705/7.31 |
| 2015/0339683 | A1* | 11/2015 | Kannan | G06Q 30/016 705/7.31 |
| 2016/0004426 | A1 | 1/2016 | Ishibashi | |

OTHER PUBLICATIONS

An Office Action; "Notice of Reasons for Rejection," issued by the Japanese Patent Office dated Aug. 16, 2016, which corresponds to Japanese Patent Application No. 2016-016290 and is related to the present application; with English language Concise Explanation.

An Office Action; "Notice of Reasons for Rejection," issued by the Japanese Patent Office dated Jan. 10, 2017, which corresponds to Japanese Patent Application No. 2016-016290 and is related to the present application; with English language Concise Explanation.

* cited by examiner

MOBILE PHONE, DISPLAY CONTROL METHOD, AND NON-TRANSITORY COMPUTER-READABLE RECORDING MEDIUM

CROSS-REFERENCE TO RELATED APPLICATIONS

This application claims priority to and the benefit of Japanese Patent Application No. 2016-016290 filed on Jan. 29, 2016, the entire contents of which are incorporated herein by reference.

TECHNICAL FIELD

This disclosure relates to a mobile phone. In particular, this disclosure relates to a mobile phone of a feature-phone type.

BACKGROUND

Mobile phones such as smartphones currently commercially available are generally configured to, when power thereof is turned on, display a lock screen for disabling any operation other than a predetermined operation in a display composed of a touch screen (e.g., PLT 1). Such a lock screen generally allows display of notification (Notification) of various information such as, for example, a missed call and reception of e-mail.

SUMMARY

A mobile phone of a feature-phone type according to one of the embodiments of the disclosure includes:
a controller configured to:
display an active Heads-Up Notification in a display and, after a predetermined time period, hide the active Heads-Up Notification; and
display a passive Heads-Up Notification in the display and, after a predetermined time period, forcibly hide the passive Heads-Up Notification.

A display control method according to one embodiment of the disclosure is a display control method executed by a mobile phone of a feature-phone type, the display control method including:
displaying an active Heads-Up Notification in a display and, after a predetermined time period, hiding the active Heads-Up Notification; and
displaying a passive Heads-Up Notification in the display and, after a predetermined time period, forcibly hiding the passive Heads-Up Notification.

A non-transitory computer-readable recording medium includes computer program instructions, which when executed by a mobile phone of a feature-phone type, cause the mobile phone to:
display an active Heads-Up Notification in a display and, after a predetermined time period, hide the active Heads-Up Notification; and
display a passive Heads-Up Notification in the display and, after a predetermined time period, forcibly hide the passive Heads-Up Notification.

BRIEF DESCRIPTION OF THE DRAWINGS

In the accompanying drawings.

DETAILED DESCRIPTION

The smartphone, for example, in response to a flick operation performed by a user outside an area displaying the notification in the touch screen, may switch a display to a home screen displaying, for example, icons of applications. Also, the smartphone, in response to a tap operation performed by the user in the area displaying the notification in the touch screen, may switch the display to a screen corresponding to the notification. For example, in response to the tap operation performed in an area displaying notification of a missed call, detailed information about the missed call may be displayed, and the display may shift to a screen allowing making a phone call to a phone number of the other party of the missed call. Also, for example, in response to the tap operation performed in the area displaying the notification of the reception of the e-mail, an e-mail application (application software) may be activated to display contents of the e-mail received.

When a mobile phone such as a feature phone, similarly to the smartphone, is capable of implementing a notification function with a simple operation, the mobile phone of the feature-phone type may enhance the convenience thereof.

The disclosure herein aims to provide the mobile phone of the feature-phone type with enhanced convenience.

According to the disclosure, the convenience of the mobile phone of the feature-phone type may be enhanced.

Hereinafter, an embodiment of the disclosure will be described with reference to the drawings.

Hereinafter, the embodiment of the disclosure will be described assuming that a mobile phone of a feature-phone type is what is called a feature phone of a folding type (a flip type or a clamshell type), by way of example. However, the embodiment of the disclosure is not limited to the mobile phone of the folding type but may be a feature phone of a slide type having a slide-out keyboard, or a feature phone of a bar type (a straight type). Here, although the mobile phone of the feature-phone type according to the present embodiment includes, for example, OS installed therein such as, for example, Android® (Android is a registered trademark in Japan, other countries, or both) corresponding to an operation of a touch panel (hereinafter, also referred to as a touch screen) integrally provided with a display, this mobile phone has no touch screen and is operated by, for example, physical keys. Or, the mobile phone of the feature-phone type according to the present embodiment may have the touch screen and allow the touch screen and the physical keys to perform the same operation. In this case, the mobile phone of the feature-phone type according to the present embodiment is not limited to one in which the physical keys may perform all operations of the touch screen but may be one in which the physical keys may perform some operations of the touch screen.

Figure 1:
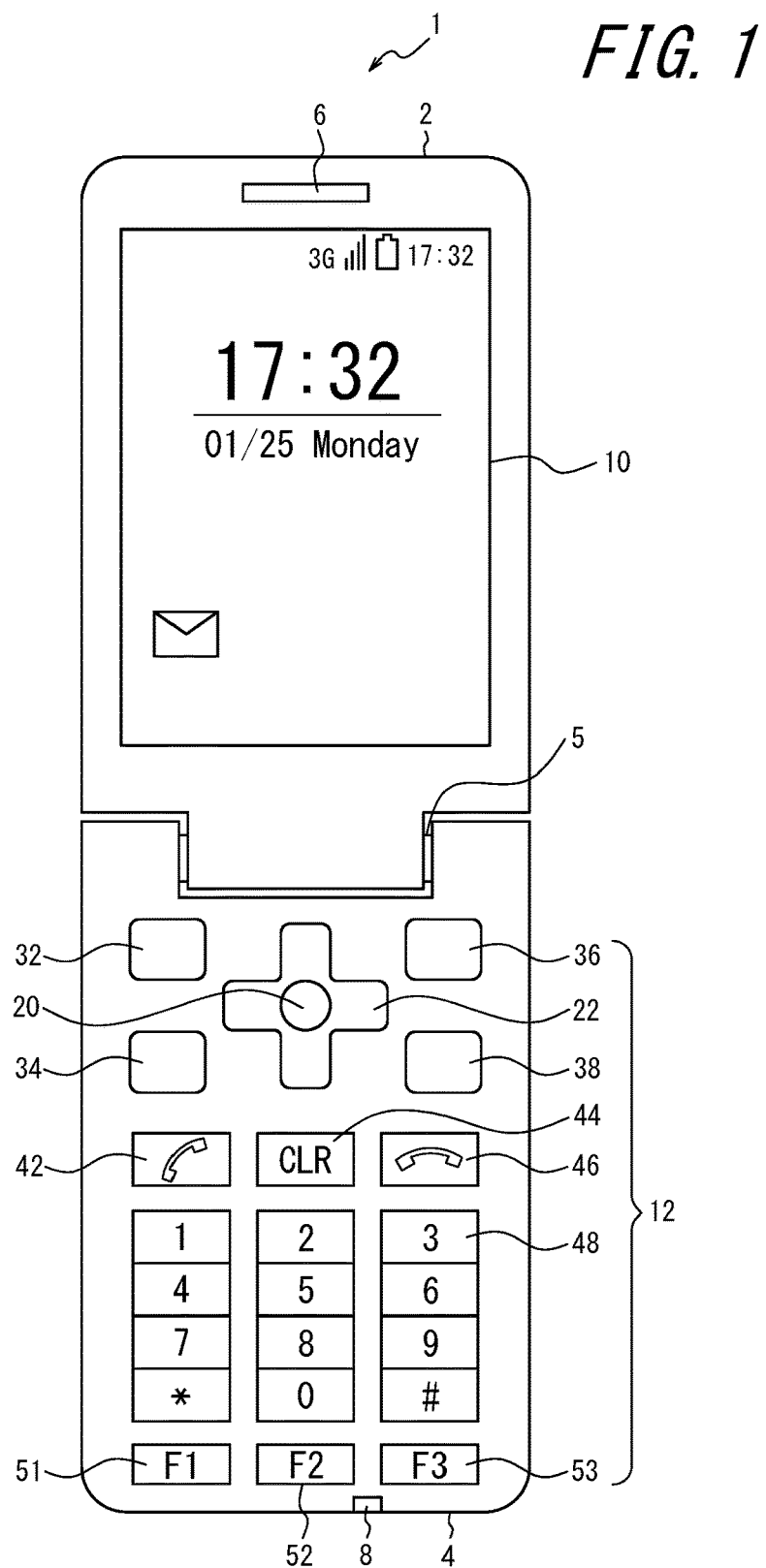
FIG. 1 is a diagram illustrating an external view of a mobile phone according to an embodiment of the disclosure.

FIG. 1 is a diagram illustrating an external view of the mobile phone according to the embodiment of the disclosure.

As illustrated in FIG. 1, a mobile phone 1 of a feature-phone type according to the present embodiment is the mobile phone of the folding type having an upper housing 2 and a lower housing 4 joined together by using a hinge 5. The mobile phone 1 is structured in such a manner that the upper housing 2 and the lower housing 4 are foldable at the hinge 5 serving as a valley. Since the mobile phone 1 may have an external structure similar to that of a conventionally well-known mobile phone of a folding feature-phone type, a detailed description of the external structure of the mobile phone 1 will be omitted.

As illustrated in FIG. 1, the mobile phone 1 includes, in the upper housing 2, a receiver 6 and a display 10. Also, the mobile phone 1 includes, in the lower housing 4, a microphone 8 and a physical key unit (a keyboard) 12 configured with various physical keys. The receiver 6 outputs voice to a user's ear during a phone call, and the microphone 8 obtains voice from the user's mouth during the phone call. Since the receiver 6 and the microphone 8 may be similar to those employed by general mobile phones, detailed descriptions thereof will be omitted. The physical key unit 12 detects an input by a user who is operating the mobile phone 1.

The display 10 is a display device such as a liquid crystal display, an organic EL display, an inorganic EL display, or the like. The display 10 may include a light source or a light-emitting element employed as a backlight. The display 10 displays, to the user operating the mobile phone 1, various information including a character, a symbol, an image, a depicted operation object (an icon), and the like.

The physical key unit 12 includes a center key (an OK key) 20 configured as one physical key, a direction key (a cursor key) 22, a menu key 32, an e-mail key 34, a camera key 36, a website key 38, a call-start key 42, a clear key 44, a call-end/power key 46, a numeric keypad 48, and three function keys 51, 52, and 53. The numeric keypad 48 includes numeric keys of number 0 to 9 and other symbol keys. Each of the keys constituting the physical key unit 12 may be an automatic-restoration switch of a push-button type. Since a function of each of the keys constituting the physical key unit 12 may be similar to that of the general mobile phone, detailed descriptions thereof will be omitted. In FIG. 1, also, the character or the symbol engraved on a keytop of each of the keys constituting the physical key unit 12 is appropriately simplified or omitted.

Figure 2:
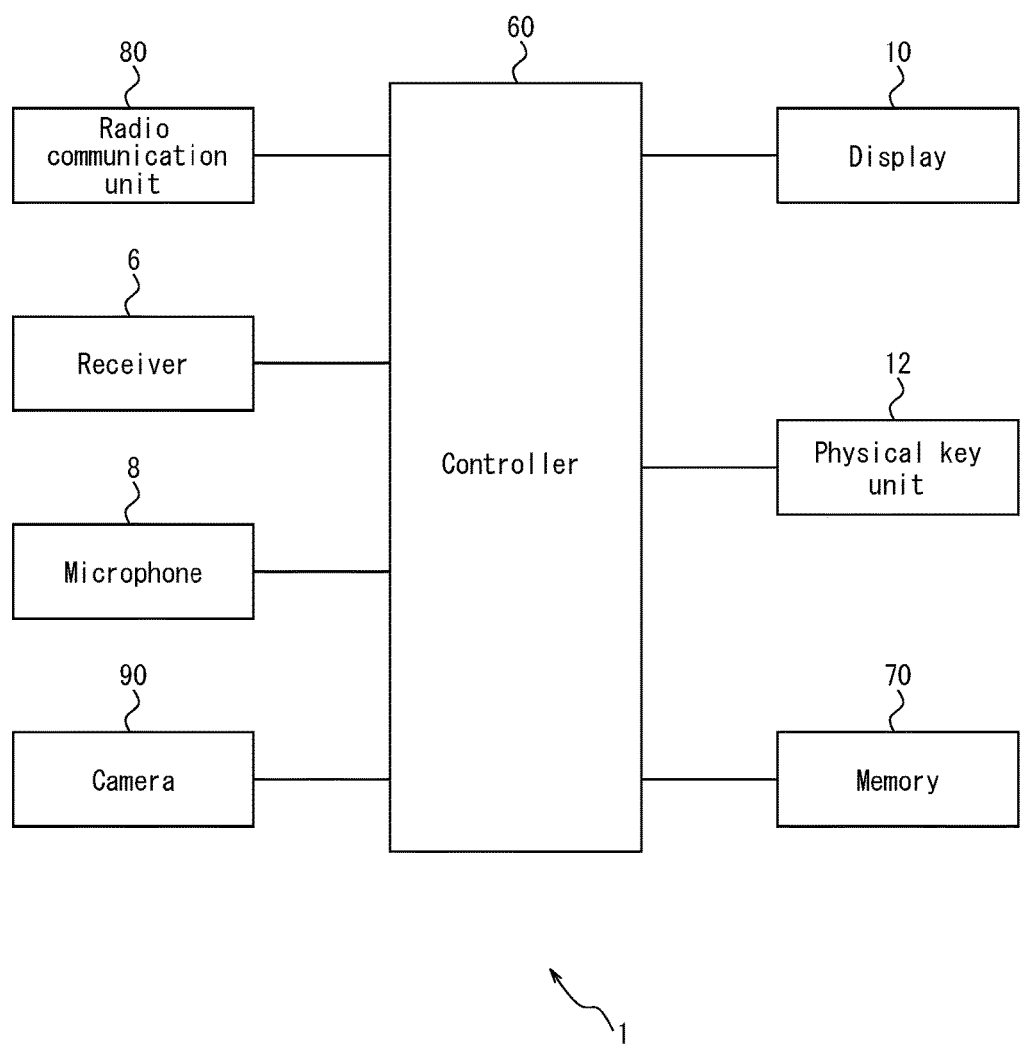
FIG. 2 is a block diagram illustrating a schematic configuration of the mobile phone according to the embodiment of the disclosure.

FIG. 2 is a block diagram illustrating a schematic configuration of the mobile phone according to the embodiment of the disclosure.

As illustrated in FIG. 2, the mobile phone 1, from a functional point of view, includes the display 10, the physical key unit 12, and a controller 60. Also, the mobile phone 1, as described referring to FIG. 1, in order to implement a function of the mobile phone, includes the receiver 6 and the microphone 8. As illustrated in FIG. 2, the mobile phone 1 also includes a memory 70 and a radio communication unit 80. Further, the mobile phone 1 may appropriately include a camera 90 for allowing the shooting of a photograph or a video, a speaker for outputting a ringtone and the like, a vibrator for vibrating the mobile phone 1 in its entirety, and the like.

The controller 60 may be constituted by using a processor for controlling and managing the mobile phone 1 in its entirety including each functional block thereof. The controller 60 may be a program of OS installed in the mobile phone 1, or a processor such as a CPU for executing a program which defines a control procedure. The program executed by the controller 60 is stored in, for example, the memory 70 or an external storage medium.

The memory 70 may be constituted by using a storage device such as a semiconductor memory and may store various information and a program for operating the mobile phone 1 and the like, as well as functioning as a work memory. The memory 70 may include, for example, RAM and ROM. The memory 70 stores, for example, a particular program corresponding to an application for controlling such that the controller 60 executes a particular function, text data such as e-mail, and image data.

The radio communication unit 80 connects to a communication network by performing a radio communication with, for example, a radio communication base station and the like via an antenna and thus realizes functions of the mobile phone 1 to make and receive a phone call, or to perform a data communication. Since the radio communication unit 80 may be constituted similarly to an element of a general smartphone or feature phone for realizing a radio communication function, a more detailed description of the radio communication unit 80 will be omitted.

The camera 90 is an element for realizing a function of a digital camera capable of shooting a still image or a video. Data of the still image or the video shot by the camera 90 may be stored in, for example, the memory 70. Since the camera 90 may be constituted similarly to a camera of the general smartphone or feature phone, a more detailed description of the camera 90 will be omitted.

The mobile phone 1 according to the present embodiment has an OS (a change OS) installed therein, in which a plurality of specific codes are added to, for example, a program of the OS (a standard OS) provided by a provider of the OS. The plurality of specific codes include, for example, a first specific code for performing specific processing associated with Heads-Up Notification (hereinafter, also referred to as a "HUN"). The first specific code will be described in detail later.

(HUN of Standard OS)

Here, the HUN will be described by using, by way of example, the general smartphone having the standard OS installed therein and also having the touch screen. The HUN is Notification (notification) displayed on a screen in an overlapping manner (in a pop-up manner). The HUN is displayed by a standard function of the standard OS in response to a request (a notification request) from an application being run in the background.

For example, a creator of the application preliminarily programs the application in such a manner that, when a predetermined event (for example, reception of e-mail) occurs while the application (for example, an e-mail app) is being run in the background, the notification request is output to the OS. Here, the notification request includes information about contents of the notification (for example, a message) and a priority which are preliminarily set by the creator of the application. The priority includes, for example, five levels of "MIN", "LOWERED", "DEFAULT", "HIGH", and "MAX" in the order of ascending priorities, one of which is to be selected.

Upon reception of the notification request, the standard OS, when a predetermined condition is satisfied, i.e., when a screen of another application being run in the foreground is displayed in full-screen and, simultaneously, the priority of the notification request is "HIGH" or higher, displays notification as the HUN based on the notification request.

Here, the HUN displayed on the screen of the smartphone also functions as a user interface for receiving an input from the user via the touch screen. Based on the input (e.g., a tap operation, a swipe operation, a flick operation, etc.) from the user to the HUN displayed on the screen, a common operation to the HUN, such as an operation to hide the HUN or an operation to shift an application associated with the HUN to the foreground, is performed.

Also, the HUN is classified into two types: a HUN of an active type (hereinafter, also referred to as an "active HUN") and a HUN of a passive type (hereinafter, also referred to as a "passive HUN").

Figure 3:
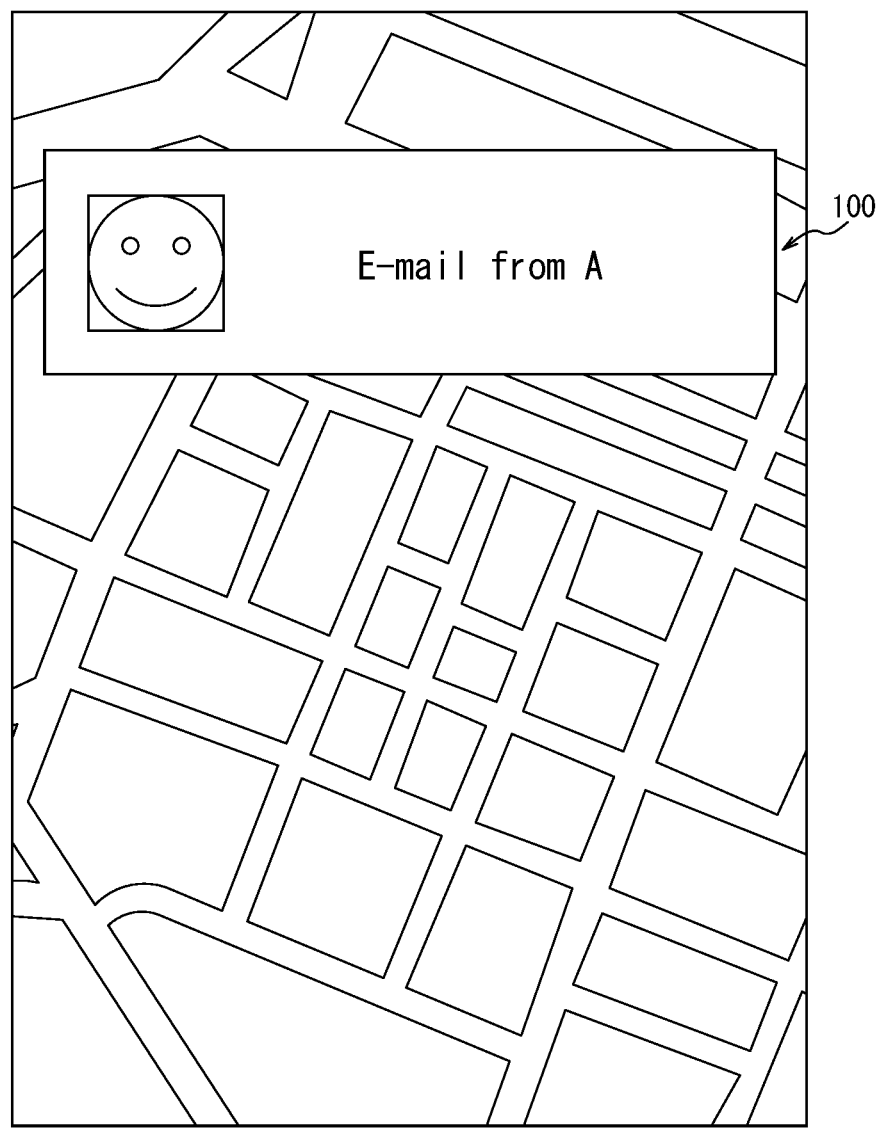
FIG. 3 is a diagram illustrating an example of a screen displaying an active Heads-Up Notification.

The active HUN is a HUN which is automatically hidden when a predetermined time period has elapsed after the active HUN is displayed on the screen. The active HUN is generally used for notification simply presenting a message to the user and does not require a response from the user. For example, FIG. 3 illustrates a state in which, while a screen of an application A (e.g., a map screen in the full-screen) is displayed, an active HUN 100 by an application B (e.g., an e-mail application) is displayed. The active HUN 100 of FIG. 3 includes a message informing about reception of the e-mail.

Figure 4:
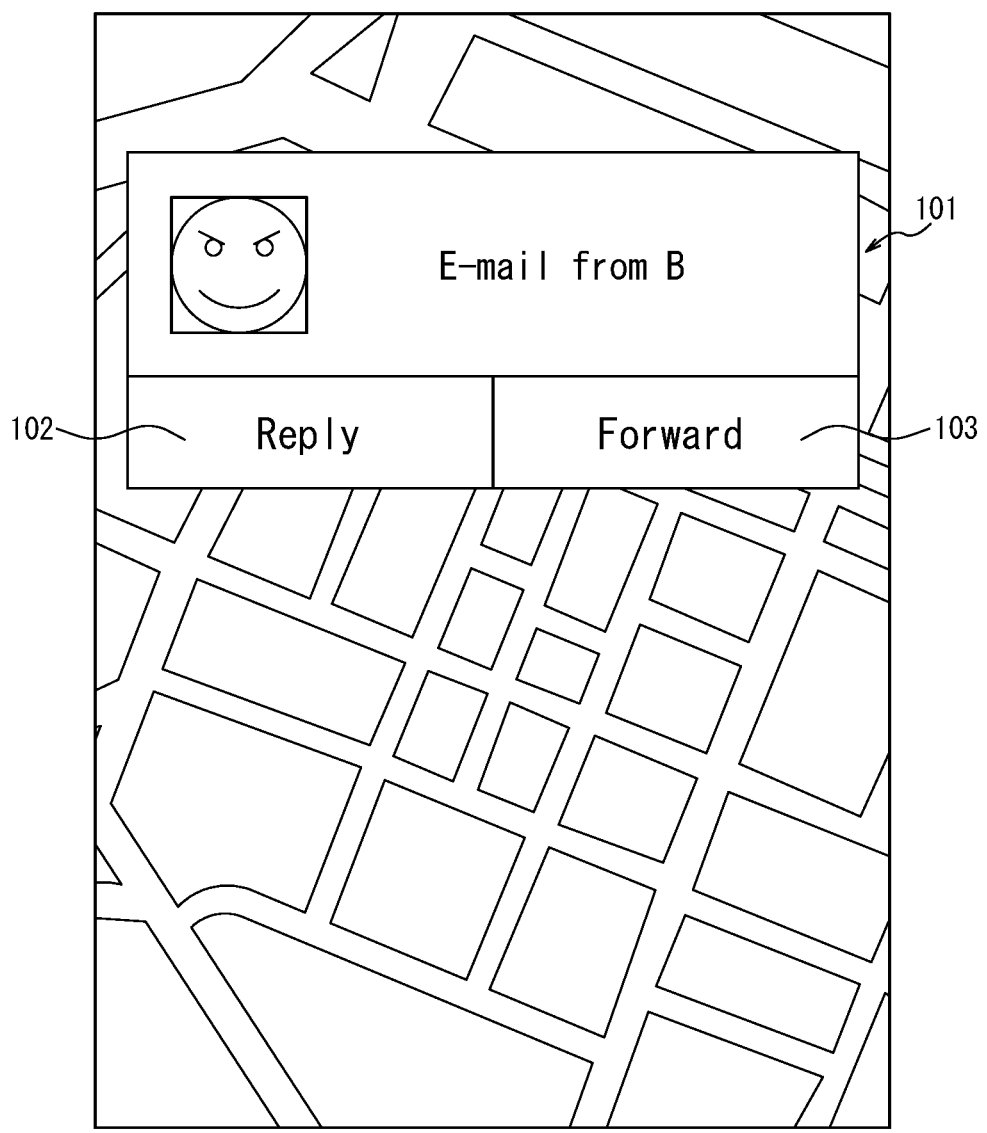
FIG. 4 is a diagram illustrating an example of a screen displaying a passive Heads-Up Notification.

On the other hand, the passive HUN, unlike the active HUN, is not automatically hidden after a while following the display of the passive HUN on the screen. Also, the passive HUN may include a predetermined number of (e.g., maximum three) action buttons. The action button is a user interface displayed together with contents of the notification in the passive HUN and receives the input from the user via the touch screen. Based on the operation (e.g., the top operation) by the user to an action displayed on the screen, a function of the application corresponding to the action is executed. For example, FIG. 4 illustrates a state in which, while the screen of the application A (e.g., the map screen in the full-screen) is displayed, a passive HUN 101 by the application B (e.g., the e-mail application) is displayed. The passive HUN 101 of FIG. 4 displays a message informing about the reception of the message, an action button 102 to reply, and an action button 103 to forward.

The creator of the application preliminarily describes, in the program of the application, about which one of the active HUN and the passive HUN is to be displayed as the notification issued by the application and contents of the action button contained in the passive HUN. As described above, since the standard OS corresponds to the operation of the touch screen, the creator of the application generally programs the application assuming that an information processing apparatus for executing the application includes the touch screen.

(HUN of Change OS)

Next, the HUN of the change OS installed in the mobile phone 1 according to the present embodiment will be described. As described above, since the mobile phone 1 of the present embodiment does not include the touch screen, all functions assuming the operation to the touch screen among the functions of the change OS are inhibited. On the other hand, the change OS includes a second specific code for assigning respective functions of the application being run in the foreground to respective physical keys of the physical key unit 12. In other words, the change OS including the second specific code is an OS associated with the operation of the physical key unit 12.

As described above, however, the HUN is displayed by the application being run in the background. Therefore, execution of the second specific code may not assign a function of the HUN as the user interface as described above (e.g., a function to receive an operation to hide the HUN) to the physical key unit 12. Accordingly, the passive HUN which is not automatically hidden after a while as described above cannot be hidden by an operation to the physical key unit 12.

As such, the change OS according to the present embodiment includes the first specific code for forcibly hiding the passive HUN when, for example, a predetermined time period has elapsed after the passive HUN is displayed on the screen. The controller 60 of the mobile phone 1 executes the first specific code and thereby forcibly hides the passive HUN displayed on the screen. This configuration enables the mobile phone 1 having no touch screen to hide the passive HUN, suppressing deterioration in visibility of the screen due to, for example, the passive HUN remaining in the display 10.

The predetermined time period before the passive HUN is forcibly hidden may be a predetermined length of time or may be determined to be longer as the priority of the passive HUN becomes higher.

Preferably, the first specific code further includes a code for adding the passive HUN forcibly hidden to a Notification screen. The controller 60, by executing the first specific code, adds the passive HUN forcibly hidden to the Notification screen. The Notification screen is a screen which may be displayed by, for example, a standard function supported by the standard OS. The Notification screen includes, for example, a list of past Notifications (including Notification issued as the HUN). For example, the Notification screen illustrated in FIG. 5 displays the active HUN 100 and the passive HUN 101.

Here, when the Notification screen is displayed in the display 10, that is, when the application for displaying the Notification screen is run in the foreground, the controller 60 executes the second specific code and thereby assigns respective functions of the application to respective physical keys of the physical key unit 12.

Figure 5:
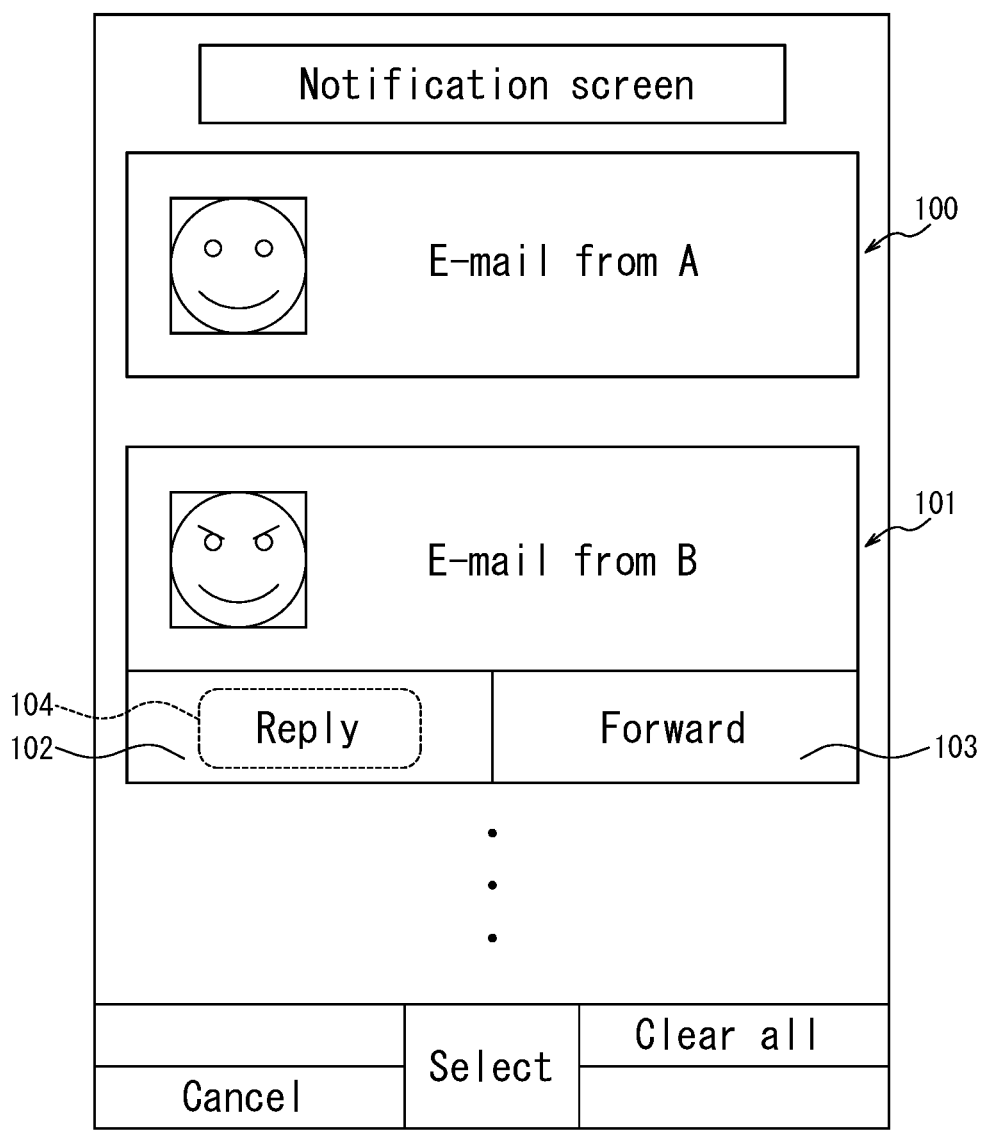
FIG. 5 is a diagram illustrating examples of a Notification screen according to the embodiment of the disclosure.

For example, while the Notification screen is displayed in the display 10, the controller 60 moves the cursor 104 based on an operation to the direction key 22. In FIG. 5, for example, the cursor 104 is selecting an action button 102 of "Reply" contained in the passive HUN. Subsequently, the controller 60, based on the operation to the center key 20, performs an operation associated with the Notification selected by the cursor 104. In FIG. 5, for example, the controller 60 executes an operation associated with the passive HUN 101 being selected by the cursor 104, in particular, an operation corresponding to the action button 102 of "Replay". By performing this operation, the controller 60 executes, for example, the e-mail application in the foreground and, simultaneously, displays an input screen of a reply e-mail in the display 10.

Figure 6:
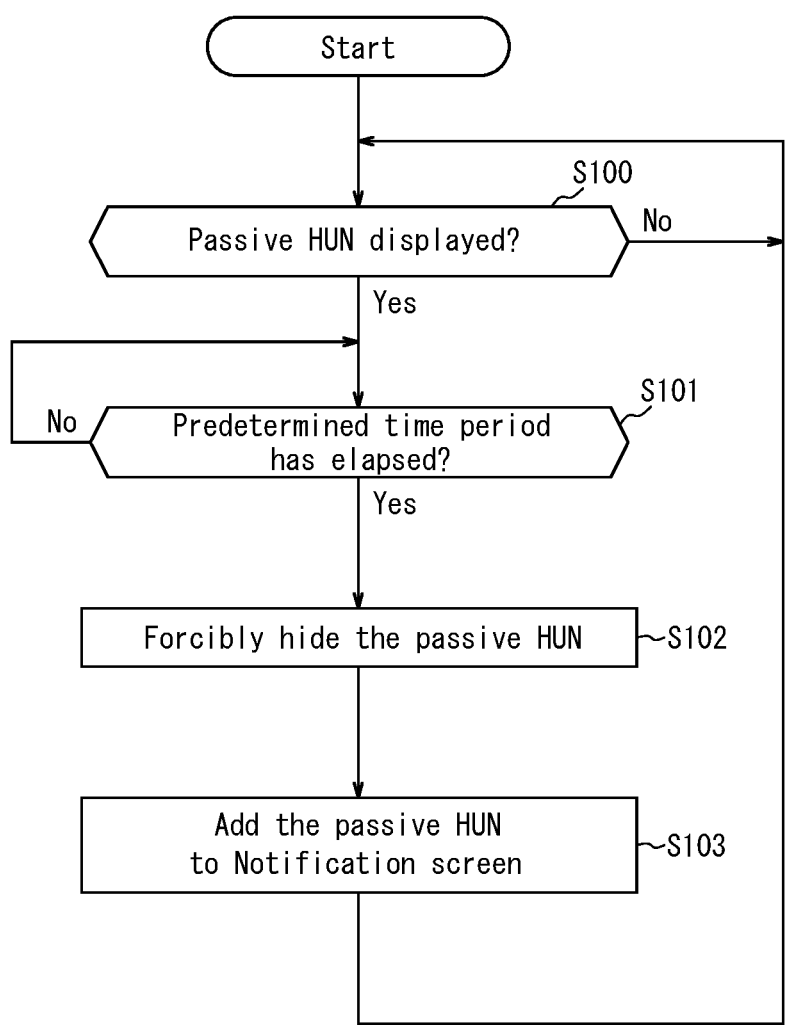
FIG. 6 is a flowchart illustrating an operation of the mobile phone according to the embodiment of the disclosure.

Referring to FIG. 6, next, an operation of the mobile phone 1 to forcibly hide the passive HUN will be described. This operation is performed by execution of the first specific code added to the change OS.

Step S100: The controller 60 first determines whether the passive HUN is displayed in the display 10. When determining that the passive HUN is displayed (Yes at step S100), the controller 60 proceeds to step S101. On the other hand, when determining that the passive HUN is not displayed (No at step S100), the controller 60 repeats the step S100.

Step S101: When determining at step S100 that the passive HUN is displayed (Yes at step S100), the controller 60 determines whether the predetermined time period has elapsed after the passive HUN is displayed. When determining that the predetermined time period has elapsed (Yes at step S101), the controller 60 proceeds to step S102. On the other hand, when determining that the predetermined time period has not elapsed (No at step S101), the controller 60 repeats the step S101.

Step S102: When determining at step S101 that the predetermined time period has elapsed (Yes at step S101), the controller 60 forcibly hides the passive HUN displayed in the display 10.

Step 103: Then, the controller 60 adds the passive HUN forcibly hidden at step S102 to the Notification screen. Then, the controller 60 returns to step S100.

As described above, the mobile phone 1 of the present embodiment, when displays the passive HUN in the display 10, forcibly hides the passive HUN after the predetermined time period. This configuration allows, for example, the mobile phone 1 of the feature-phone type having no touch screen to hide the passive HUN. Thereby, the deterioration in the visibility of the screen due to the passive HUN remaining in the display 10 is suppressed, further enhancing the convenience of the mobile phone.

Preferably, the mobile phone 1 adds the passive HUN forcibly hidden to the Notification screen. This configuration allows the user to view the HUN, which has been hidden regardless of a user's intention, in the notification screen displayed in the display 10 later, and thus the convenience of the mobile phone is further enhanced.

Preferably, also, while the Notification screen is displayed in the display 10, the mobile phone 1 performs the operation associated with the passive HUN based on the operation to the physical key. This configuration allows the user to perform an operation to the passive HUN via the physical key unit 12, thereby further improving the convenience of the mobile phone 1.

Although the disclosure has been described based on the figures and the embodiment, it is to be understood that various modifications and changes may be implemented by those who are ordinarily skilled in the art based on the disclosure. Accordingly, such modifications and changes are included in the scope of the disclosure. For example, functions and the like included in each constituent, means, and step may be rearranged without logical inconsistency, so as to combine a plurality of constituents or steps together or to separate them. Also, each embodiment of the disclosure described above is not limited to the strict implementation thereof, but features thereof may be combined, or some of the features may be omitted.

The invention claimed is:

1. A mobile phone of a feature-phone type, comprising:
a controller configured to execute programs of a predetermined operating system (OS) including:
  a function of displaying an active Heads-Up Notification in a display and, after a first predetermined time period, hiding the active Heads-Up Notification; and
  a function of displaying a passive Heads-Up Notification in the display and not hiding the passive Heads-Up Notification until a user input is received, wherein
the controller is configured to execute programs of a change operating system (OS) changed from the predetermined OS, the change OS including a function of displaying the passive Heads-Up Notification in the display and, without receiving the user input and after a second predetermined time period, forcibly hide the passive Heads-Up Notification.

2. The mobile phone according to claim 1, wherein the controller is configured to add the passive Heads-Up Notification, which has been forcibly hidden by the controller, to a Notification screen to notify the forcibly hidden passive Heads-Up Notification to a user when the Notification screen is displayed in the display.

3. The mobile phone according to claim 2, wherein the controller is configured to, while the Notification screen is displayed in the display, perform an operation associated with the passive Heads-Up Notification based on an operation to a physical key.

4. The mobile phone according to claim 1, wherein the controller is configured to execute a code added to the predetermined OS of the mobile phone to forcibly hide the active Heads-Up Notification.

5. The mobile phone according to claim 2, wherein the controller is configured to execute a code added to the predetermined OS of the mobile phone to forcibly hide the active Heads-Up Notification.

6. The mobile phone according to claim 3, wherein the controller is configured to execute a code added to the predetermined OS of the mobile phone to forcibly hide the active Heads-Up Notification.

7. A display control method executed by a mobile phone of a feature-phone type, the display control method comprising:
executing, by a controller of the mobile phone, programs of a predetermined operating system (OS) including:
  a function of displaying an active Heads-Up Notification in a display and, after a first predetermined time period, hiding the active Heads-Up Notification; and
  a function of displaying a passive Heads-Up Notification in the display and not hiding the passive Heads-Up Notification until a user input is received, wherein
the display control method includes executing programs of a change operating system (OS) changed from the predetermined OS, the change OS including a function of displaying the passive Heads-Up Notification in the display and, without receiving the user input and after a second predetermined time period, forcibly hiding the passive Heads-Up Notification.

8. A non-transitory computer-readable recording medium including computer program instructions, which when executed by a mobile phone of a feature-phone type, cause the mobile phone to:
execute, by a controller of the mobile phone, programs of a predetermined operating system (OS) including:
  a function of displaying an active Heads-Up Notification in a display and, after a first predetermined time period, hide the active Heads-Up Notification; and
  a function of displaying a passive Heads-Up Notification in the display and not hiding the passive Heads-Up Notification until a user input is received, wherein
the recording medium includes instructions that causes the mobile phone to execute programs of a change operating system (OS) changed from the predetermined OS, the change OS including a function of displaying the passive Heads-Up Notification in the display and, without receiving the user input and after a second predetermined time period, forcibly hide the passive Heads-Up Notification.

* * * * *